United States Patent
Sleator

(10) Patent No.: US 9,240,837 B2
(45) Date of Patent: Jan. 19, 2016

(54) SYSTEMS AND METHODS USING OPTICAL COMMUNICATION FOR COMMISSIONING OF NETWORK NODES

(71) Applicant: GOOGLE INC., Mountain View, CA (US)

(72) Inventor: Michael Sleator, Woodside, CA (US)

(73) Assignee: Google Inc., Mountain View, CA (US)

( * ) Notice: Subject to any disclaimer, the term of this patent is extended or adjusted under 35 U.S.C. 154(b) by 119 days.

(21) Appl. No.: 14/104,843

(22) Filed: Dec. 12, 2013

(65) Prior Publication Data

US 2014/0270801 A1 Sep. 18, 2014

Related U.S. Application Data

(60) Provisional application No. 61/777,448, filed on Mar. 12, 2013.

(51) Int. Cl.
| | |
|---|---|
| *H04W 12/02* | (2009.01) |
| *H04W 12/04* | (2009.01) |
| *H04B 10/2575* | (2013.01) |
| *H04B 10/114* | (2013.01) |
| *H04L 9/08* | (2006.01) |
| *H04L 29/06* | (2006.01) |

(52) U.S. Cl.
CPC ...... *H04B 10/25752* (2013.01); *H04B 10/1149* (2013.01); *H04W 12/04* (2013.01); *H04L 9/0869* (2013.01); *H04L 63/18* (2013.01); *H04W 12/02* (2013.01)

(58) Field of Classification Search
USPC ............................................ 398/140; 348/61
See application file for complete search history.

(56) References Cited

U.S. PATENT DOCUMENTS

| | | | |
|---|---|---|---|
| 5,793,880 A | 8/1998 | Constant | |
| 8,248,467 B1 | 8/2012 | Ganick et al. | |
| 2005/0102335 A1* | 5/2005 | Castejon-Amenedo | H03K 3/84 708/250 |
| 2007/0157026 A1* | 7/2007 | Zimmermann | H04L 9/0844 713/171 |
| 2010/0172651 A1 | 7/2010 | Nien et al. | |
| 2011/0052214 A1 | 3/2011 | Shimada et al. | |
| 2012/0155643 A1* | 6/2012 | Hassan | H04L 9/083 380/270 |
| 2012/0155889 A1* | 6/2012 | Kim | H04B 10/116 398/193 |
| 2013/0027528 A1* | 1/2013 | Staats | G01S 5/0009 348/61 |
| 2013/0028609 A1 | 1/2013 | Staats et al. | |

* cited by examiner

Primary Examiner — David Payne
Assistant Examiner — Omar S Ismail
(74) Attorney, Agent, or Firm — McDonnell Boehnen Hulbert & Berghoff LLP

(57) ABSTRACT

Embodiments relate to methods, devices, and computer-implemented methods for transmitting a modulated signal transmitted from at least one signal light source and using the modulated signal for commissioning of network nodes. The method can include determining, by a network node, that the network node is not commissioned. The method can further include generating, by the network node, a random number, and generating a modulated light signal based on the random number. In addition, the method can include transmitting, to an image capture device, the modulated light signal, receiving, from a network control unit, via a radio channel, an encrypted commissioning message, and decrypting, by the network node, the encrypted commissioning message using the random number. Further, the method can include establishing, with the network control unit, communication based on data in the encrypted commissioning message.

19 Claims, 11 Drawing Sheets

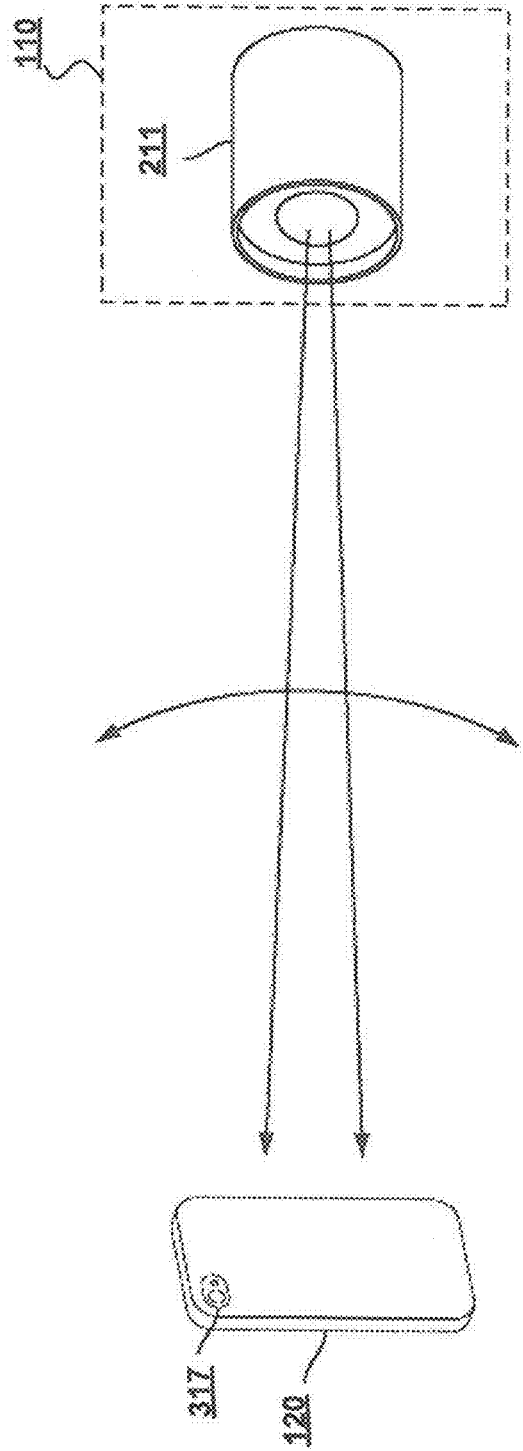

SYSTEMS AND METHODS USING OPTICAL COMMUNICATION FOR COMMISSIONING OF NETWORK NODES

CROSS-REFERENCE TO RELATED APPLICATIONS

This application claims priority to U.S. Provisional Patent Application Ser. No. 61/777,448 filed on Mar. 12, 2013, the disclosure of which is hereby incorporated by reference in its entirety.

TECHNICAL FIELD

The present disclosure relates to systems and methods for commissioning network nodes in a wireless network and, more particularly, to systems and methods for securely commissioning network nodes in a wireless network via an optical communications link between the network node and an image capture device.

BACKGROUND

In order to maintain security in a network such as a home automation system, the admission of devices into the network is controlled. This typically involves either imparting network access information from the network to the device to be admitted, or conveying information from the device to the network. Since it is very difficult to confine radio communications to a physically secure area, exchanges of private information can be subject eavesdropping, man-in-the-middle, and replay attacks. In order to prevent this, encryption is commonly used to protect the information sent over the radio channel. Establishing encrypted communication requires some form of cryptographic key exchange between the participants. This can be done either over the radio channel itself, or by some independent means. To exchange keys securely over an unsecured channel requires a secure key exchange algorithm such as Diffie-Hellman-Merkle Key Exchange. These algorithms typically place a burden on very simple network nodes, such as light switches, light bulbs, and so forth, that is unacceptable in terms of computational and/or energy resources. Several mechanisms have been considered for conveying commissioning information to or from devices without the use of radio links. For example, the user can manually enter data printed on the device or its packaging into a network control device, the data exchange can be confined to a small period of time initiated by some user action (e.g., pressing a button), or a camera on a smart phone or tablet can be used to scan and decode codes printed on the device or its packaging, such as linear bar codes and two dimensional codes such as quick response (QR) and DataMatrix codes.

SUMMARY

In accordance with aspects of the present disclosure, a computer-implemented method is disclosed for commissioning of network nodes in a wireless network having a network control unit or associated with a network control unit using optical communications, comprising: determining, by a network node, that the network node is not commissioned; generating, by the network node, a random number; generating a modulated light signal based on the random number; transmitting, to a photodetector, the modulated light signal; receiving, from a network control unit, via a radio channel, an encrypted commissioning message; decrypting, by the network node, the encrypted commissioning message using the random number; establishing, with the network control unit, communication based on data in the encrypted commissioning message.

In some aspects, the functionality of the network control unit can be a distributed function amongst existing members of the network where the network does not have an explicit physical network control device, such as a mesh network.

In some aspects, the photodetector can include, but is not limited to, a one or more photodiodes, one or more image capture devices and/or sensors, or sensors capable of converting radiation received upon the sensing surface of the sensor to a voltage or a current.

In some aspects, the photodetector and the network control unit are distinct entities. In this implementation, the random number received by the photodetector is communicated to the network control device over a wireless network, e.g., WiFi, Bluetooth, or near-field communication (NFC), or over a wired network, e.g., using a universal serial bus (USB) or similar type link or communication channel. The link or communication channel can be secured by a physical or cryptographic mechanism that is unrelated to the random number and the ongoing commissioning process. Moreover, the network control unit is operable to both encrypt and decrypt the commissioning message using the random number as a both an encryption key and a decryption key.

In some aspects, the computer-implemented method can further include: storing, in a memory of the network node, commissioning data.

In some aspects, the computer-implemented method can further include wherein the determining that the network node is not commissioned further includes: determining, by the network node, that commissioning data is not stored in a memory of the network node.

In some aspects, the computer-implemented method can further include wherein the receiving the encrypted commissioning message further includes receiving, from the network control unit, an indication of an updated communication protocol.

In some aspects, the computer-implemented method can further include wherein the receiving the updated communication protocol further includes: receiving, from the network control unit, an indication of an updated encryption key.

In some aspects, the computer-implemented method can further include wherein the establishing the communication further includes: establishing radio communication with the network control unit.

In some aspects, the computer-implemented method can further include wherein the generating the random number further includes: generating the random number using a random number generator associated with the network node.

In some aspects, the computer-implemented method can further include wherein the generating the random number further includes: generating the random number using thermal noise.

In some aspects, the computer-implemented method can further include wherein the generating the random number further includes: generating the random number using quantum tunneling.

In some aspects, the random number can be generated using other entropy sources, including, but is not limited to, hardware, e.g., processor, memory, and timing components, and/or software sources, e.g., operating system and other application-based sources.

In some aspects, the computer-implemented method can further include wherein the random number is a session key.

In accordance with aspects of the present disclosure, a network node is disclosed that uses optical communications for commissioning into a wireless network having a network control unit, the network node comprising: at least one memory to store data and instructions; at least one processor configured to access the at least one memory and execute instructions to determine that the network node is not commissioned; a random-number generator configured to generate a random number when the network node is not commissioned; a modulation unit configured to generate a modulation signal that includes the random number, and generate a modulated carrier wave by modulating a carrier wave with the modulation signal; a light transmitting unit configured to transmit, to the network control unit via an image capture device, the modulated carrier wave; and a transceiver configured to receive commissioning data including network access information, and communicate with the network control unit based on the commissioning data.

In some aspects, the network node further includes wherein the at least one processor is further configured to: store the commissioning data in the at least one memory.

In some aspects, the network node further includes wherein the at least one processor is configured to determine that the network node is not commissioned, the at least one processor is further configured to: determine, upon power-up of the network node, that the commissioning data is not stored in the memory of the network node.

In some aspects, the network node further includes wherein when the transceiver is configured to receive the commissioning data, the transceiver is further configured to: receive an indication of an updated communication protocol.

In some aspects, the network node further includes wherein when the transceiver is configured to receive the commissioning data, the transceiver is further configured to: receive an indication of an updated encryption key.

In some aspects, the network node further includes wherein when the transceiver is configured to communicate with the network control unit, the transceiver is further configured to: communicate with the network control unit using radio frequency communication.

In some aspects, the network node further includes wherein when the random-number generator is configured to generate the random number, the random-number generator is further configured to: generate the random number using thermal noise.

In some aspects, the network node further includes wherein when the random-number generator is configured to generate the random number, the random-number generator is further configured to: generate the random number using quantum tunneling.

In some aspects, the network node further includes wherein the random number is a session key.

In accordance with aspects of the present disclosure, a computer-implemented method is disclosed for commissioning of network nodes in a wireless network having a network control unit using optical communications, comprising: capturing, via an image capture device associated with a network node, a set of video image frames, wherein each video image frame in the set of video image frames includes image data associated with a modulated optical carrier wave that is transmitting a randomly-generated number; sampling the image data in the set of video image frames; comparing, between different video image frames in the set of video image frames, the image data that is sampled to identify the randomly-generated number; and transmitting, via a radio channel, the randomly-generated number to a network control unit.

DESCRIPTION OF DRAWINGS

The accompanying drawings, which are incorporated in and constitute a part of this specification, illustrate embodiments of the present teachings and together with the description, serve to explain the principles of the present teachings. In the drawings:

FIG. 4A is a diagram illustrating an example network node arranged to transmit a modulated signal having a light transmitting unit with one light transmitter operable to produce a modulated carrier wave that can be detected by an image capture device in accordance with aspects of the present disclosure;

DETAILED DESCRIPTION

Figure 1:
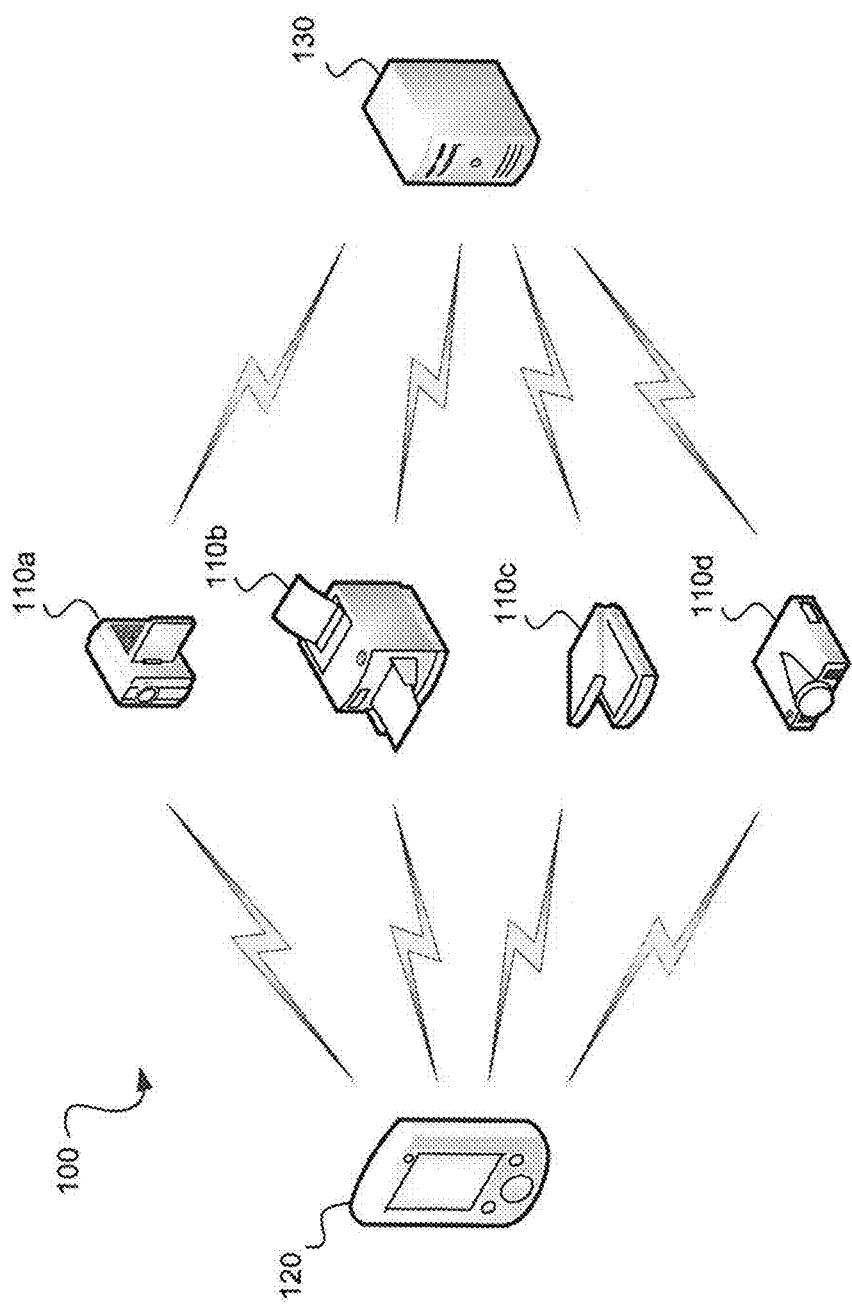
FIG. 1 is a diagram illustrating an example block diagram of a system arranged to commission network nodes using optical communications in accordance with aspects of the present disclosure.

Embodiments of the present teachings generally relate to methods and devices for commissioning network nodes in a wireless network, such as, for example, a home automation, home surveillance system, etc. More particularly, the disclosed embodiments relate to methods and devices for securely commissioning network nodes in a wireless network via an optical communications link between the network node and an image capture device, such as, for example, a smartphone camera, a computer tablet camera, etc. By commissioning network nodes via an optical communications link, the disclosed embodiments avoid the inherent security issues that can be associated with radio communications, i.e., the difficulty in confining radio communications to a physically secure area and subjecting any transmitted data to the potential of eavesdropping, man-in-the-middle, and replay attacks.

The disclosed embodiments can avoid the above-identified problems by using active optical communication between the network node being commissioned and an image capture device, which will transmit the communications to the network control device. This can allow for communication at a reasonable distance with minimal possibility of attack, and does not require manual entry of data, scanning a code on the device, or maintaining association between printed documents and devices. In certain disclosed embodiments, a light source, such as, for example, an LED, on the network node to be commissioned can be modulated with information in a serial data format. This information can take the form of a randomly-generated number that, in some embodiments, may be used as an encryption key by the network node. In one embodiment, the network node can be configured to randomly generate a unique number each time the network node is powered-on and in a non-commissioned state. If the network node is powered-on, but in a commissioned state, the network node can be configured to skip the process of randomly generating a unique number.

The light source can be positioned so as to maximize its visibility when the network node is installed in its normal location. A camera on, for example, a smartphone or tablet can detect a modulated light transmitted from the light source, and image processing software on the phone or tablet can extract the relevant pixels from the detected light image and demodulate the data stream. In one example of detecting and demodulating optically-transmitted data, referred to herein as "video mode," the camera may capture a sequence of video frames containing the modulated light signal. The image processing software can demodulate the light signal by, for example, comparing pixel values from image frame to image frame. In another example of detecting and demodulating optically-transmitted data, the device can also incorporate an accelerometer or gyroscope. In this example, referred to herein as a "streak mode," a single frame can capture the entirety of the data due to the spatial displacement of the image imparted by motion of the camera and/or light source. In some aspects, several frames can be captured in quick succession to increase the reliability of the data transfer. The camera can be moved in such a way that the camera's field of view is swept past the light source. The light source can be modulated in a continuously repeating cycle with the data to be transmitted. Because of the motion of the camera, the resulting image will contain a streak that is spatially modulated with the data. This streak can be identified within the light source image and decoded by image processing software in the camera or phone to recover the original data. In some implementations, the unprocessed image data is transferred to the network control unit or another server for processing to reduce the processing burden on the image capture device.

The image processing software can then transmit the demodulated data (e.g., the randomly-generated number) to a network control unit, which can complete the commissioning process. In some embodiments, the network control unit can complete the commissioning processing by transmitting, via radio frequency communication, a commissioning message to the network node encrypted using the data transmitted from the network node to the image capture device. In one embodiment, the commissioning data transmitted from the network control unit to the network node can contain a new communication protocol and/or a new encryption key. When the commissioning process is complete, the network node can store the commissioning data in a non-volatile memory, and set its commissioning state to "commissioned."

Reference will now be made in detail to examples of embodiments of the present teachings, which are illustrated in the accompanying drawings. Where possible the same reference numbers will be used throughout the drawings to refer to the same or like parts.

FIG. 1 is an example block diagram illustrating a system arranged to commission network nodes in a wireless network using optical communications in accordance with aspects of the present disclosure. It should be readily apparent to one of ordinary skill in the art that the system depicted in FIG. 1 represents a generalized schematic illustration and that other components/devices can be added, removed, or modified.

As shown in FIG. 1, system 100 can include one or more network nodes 110, including network nodes 110a, 110b, 110c, and 110d, an image capture device 120, and a network controller 130. Network nodes 110 can be any type of computing device configured to wirelessly transmit and/or receive data to and from image capture device 120 and/or a network controller 130. In implementations, the data can also be transmitted and/or received through a physical or wired connection. For example, the random number can be conveyed by way of a memory device or card, e.g., a USB memory device, by removing the memory device or card from the image capture device and inserting the memory device or card into the network control unit. Network nodes 110 can include, for example, computers, laptops, routers, hubs, personal digital assistants, cameras, printers, copiers, scanners, projectors, alarms, lights, home entertainment systems, audio/visual systems, home security devices, intercoms, domestic robots, appliances, HVAC systems, etc. Image capture device 120 can be any type of device configured to capture an image and store or transmit the captured image to another device, such as, for example, network controller 130. Image capture device 120 can include, for example, smartphones or camera phones, digital cameras, IP cameras, game cameras, virtual cameras, closed-circuit television cameras, surveillance cameras, movie cameras, pinhole cameras, pocket cameras, rangefinder cameras, toy cameras, traffic cameras, video cameras, etc.

In some embodiments, communication between network nodes 110 and image capture device 120 can be optical communication, i.e., any form of communication that uses light as the transmission medium. Communication between image capture device 120 and network control unit 130 can be optical communication or radio wave communication. Radio wave communication can include, for example, fixed and mobile radio communication, broadcast communication, computer networks, etc., and may be via any protocol. Although not shown, communication between network control unit 130 and network nodes 110 can be optical communication or radio wave communication.

Figure 2:
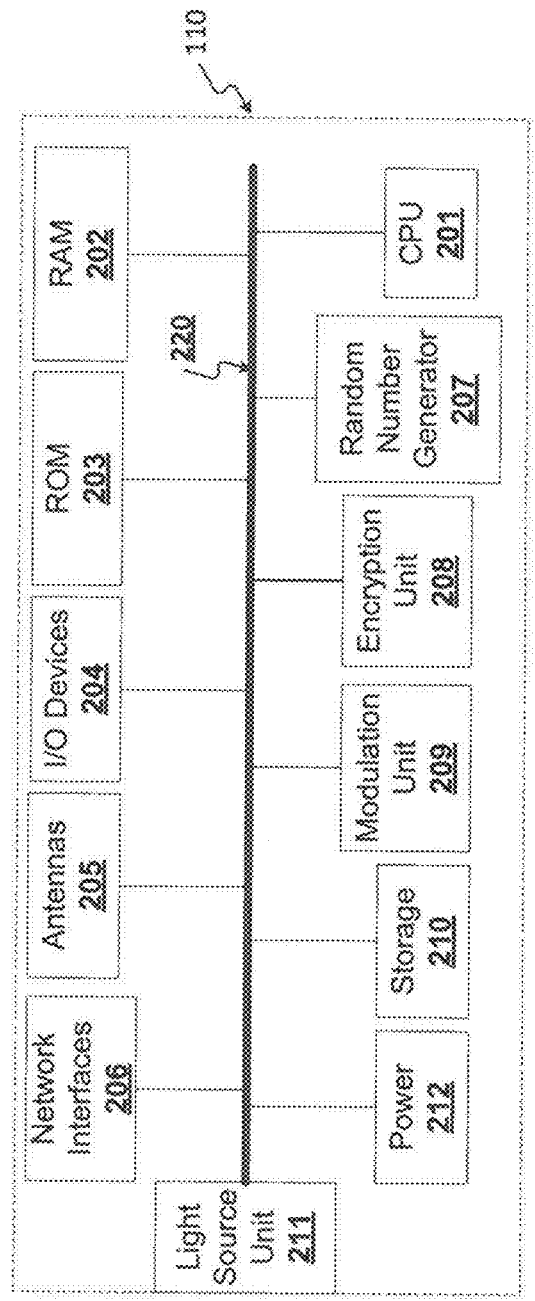
FIG. 2 is a diagram illustrating an example architecture of a network node arranged to transmit a modulated signal in accordance with aspects of the present disclosure.

FIG. 2 is a block diagram illustrating an example architecture of a network node, such as network node 110, arranged to transmit a modulated signal in accordance with aspects of the present disclosure. It should be readily apparent that the network node 110 depicted in FIG. 2 represents a generalized schematic illustration and that other components/devices can be added, removed, or modified. For example, while network node 110 illustrates transmission of encoded and/or modulated signals, network node 110 can be configured to transmit and/or receive encoded and/or modulated signals.

As shown in FIG. 2, each network node 110 can include one or more of the following components: at least one central processing unit (CPU) 201 configured to execute computer program instructions to perform various processes and methods; random access memory (RAM) 202 and read only memory (ROM) 203 configured to access and store data and information and computer program instructions; I/O devices 204 configured to provide input and/or output to network node 110 (e.g., keyboard, mouse, display, speakers, printers, modems, network cards, etc.); antennas 205; network interfaces 206 that provide wireless and/or wire line digital and/or analog interface to one or more networks (not shown) over one or more network connections (not shown); and random number generator 207 configured to generate random numbers. The random numbers can be "true" random numbers generated by hardware and/or pseudorandom numbers generated by computer algorithms.

In addition, each network node 110 can include encryption unit 208; modulation unit 209; storage medium 210 or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system or application programs, including, for example, web browser application, email application and/or other applications, and data files are stored; light source unit 211 configured to transmit and/or receive light; and a bus 220 that allows communication among the various disclosed components of network node 110 of FIG. 2. Network node 110 can also include a power source 212 that provides an appropriate alternating current (AC) or direct current (DC) to power one or more components of network node 110. Each of these components is well-known in the art and will not be discussed further.

Although not shown, network node 110 can include one or more mechanisms and/or devices by which network node 110 can perform the methods as described herein. For example, network node 110 can include one or more encoders, one or more decoders, one or more interleavers, one or more circular buffers, one or more multiplexers, one or more de-multiplexers, one or more permuters, one or more decryption units, one or more demodulation units, one or more arithmetic logic units and/or their constituent parts, etc. In addition, network node 110 can include one or more display interfaces, telephony interfaces, etc. These mechanisms and/or devices can include any combination of hardware and/or software components and can be included, in whole or in part, in any of the components shown in FIG. 2.

In one or more exemplary designs of network node 110 of FIG. 2, the functions described can be implemented in hardware, software, firmware, or any combination thereof. If implemented in software, the functions can be stored as one or more instructions or code on computer-readable media, including the computer-readable media described above (e.g., RAM 202, ROM 203, and storage medium 210). Computer-readable media include both non-transitory, tangible computer storage media and communication media including any medium that facilitates transfer of a computer program from one place to another. A storage medium can be any available medium that can be accessed by a general purpose or special purpose computer. By way of example, and not limitation, non-transitory, tangible computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Also, any connection is properly termed a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

Figure 3:
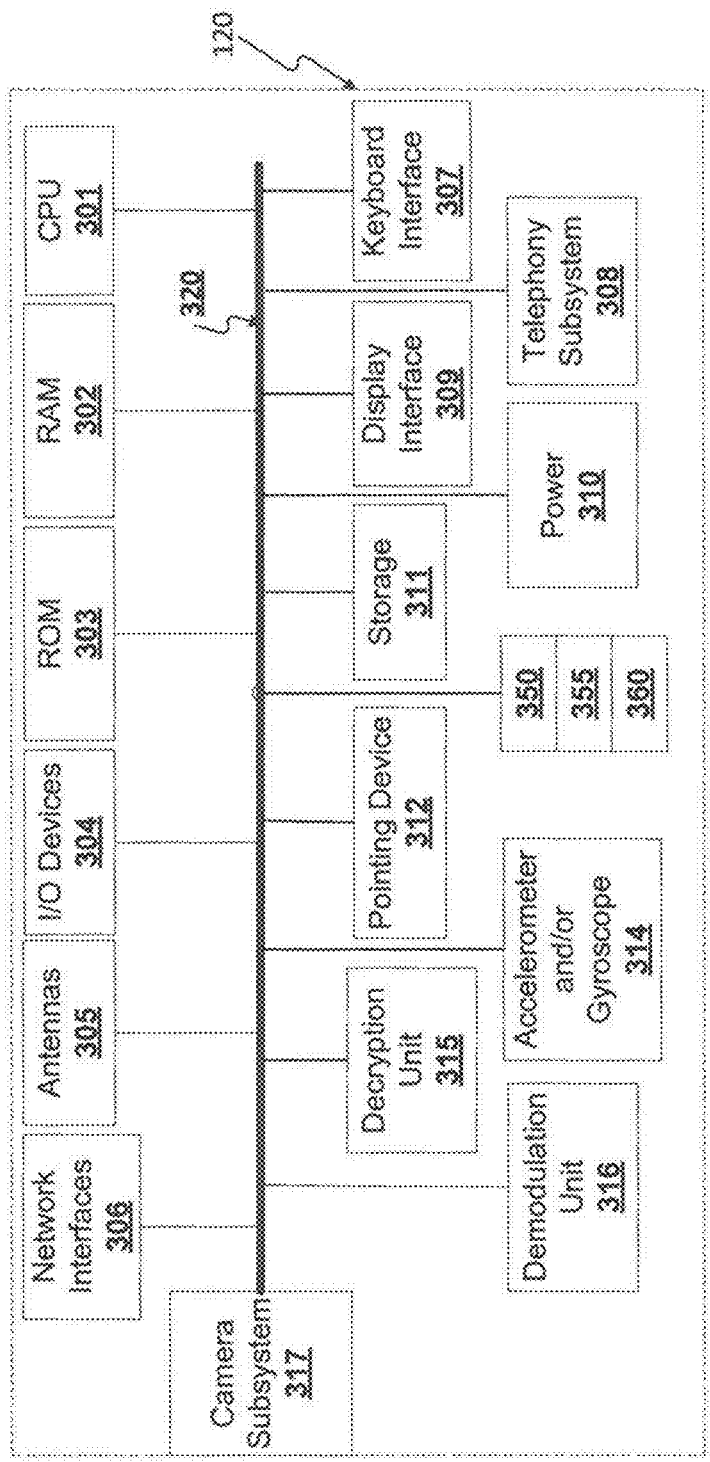
FIG. 3 is a diagram illustrating an example architecture of an image capture device in accordance with aspects of the present disclosure.

FIG. 3 is a block diagram illustrating an example architecture of an image capture device, such as image capture device 120. It should be readily apparent that the image capture device 120 depicted in FIG. 3 represents a generalized schematic illustration and that other components/devices can be added, removed, or modified. For example, while image capture device 120 illustrates reception of encoded and/or modulated signals, image capture device 120 can be configured to transmit and/or receive encoded and/or modulated signals.

Image capture device 120 can include central processing unit (CPU) 301 configured to execute computer program instructions to perform various processes and methods; random access memory (RAM) 302 and read only memory (ROM) 303 configured to access and store data and information and computer program instructions; I/O devices 304 configured to provide input and/or output to image capture device 120 (e.g., keyboard, mouse, display, speakers, printers, modems, network cards, etc.); antennas 305; network interfaces 306 that provide wireless and/or wire line digital and/or analog interfaces to one or more networks (not shown) over one or more network connections (not shown); a keyboard interface 307 that provides a communication interface to keyboard (not shown); a telephony subsystem 308 that allows image capture device 120 to transmit and receive sound over a telephone network (not shown); and a display interface 309 that provides a communication interface and processing functions for rendering video, graphics, images, and texts on a display (not shown).

Image capture device 120 can also include a power source 310 that provides an appropriate alternating current (AC) or direct current (DC) to power one or more components of image capture device 120; storage medium 311 or other suitable type of memory (e.g., such as RAM, ROM, programmable read-only memory (PROM), erasable programmable read-only memory (EPROM), electrically erasable programmable read-only memory (EEPROM), magnetic disks, optical discs, floppy disks, hard disks, removable cartridges, flash drives), where the files that comprise an operating system 350, application programs 355 including, for example, web browser application, email application and/or other applications, and data files 360 are stored; a pointing device interface 312 that provides a communication interface to a pointing device (not shown), an accelerometer and/or gyroscope unit 313; a decryption unit 315; a demodulation unit 316; a camera subsystem 317, and a bus 320 that allows communication among the various disclosed components of image capture device 120 of FIG. 3. Each of these components is well-known in the art and will not be discussed further.

Although not shown, image capture device 120 can include one or more mechanisms and/or devices by which image capture device 120 can perform the methods as described herein. For example, image capture device 120 can include one or more encoders, one or more decoders, one or more interleavers, one or more circular buffers, one or more multiplexers, one or more de-multiplexers, one or more permuters, one or more modulation units, one or more encrypting units, one or more arithmetic logic units and/or their constituent parts, etc. In addition, image capture device 120 can include one or more display interfaces, telephony interfaces, display interfaces, etc. These mechanisms and/or devices can include any combination of hardware and/or software components and can be included, in whole or in part, in any of the components shown in FIG. 3.

In one or more exemplary designs of image capture device 120 of FIG. 3, the functions described can be implemented in hardware, software, firmware, or any combination thereof. If implemented in software, the functions can be stored as one or more instructions or code on computer-readable media, including the computer-readable media described above (e.g., RAM 302, ROM 303, and storage medium 311). Computer-readable media includes both non-transitory, tangible computer storage media and communication media including any medium that facilitates transfer of a computer program from one place to another. A storage medium can be any available medium that can be accessed by a general purpose or special purpose computer. By way of example, and not limitation, non-transitory, tangible computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Also, any connection is properly termed a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above should also be included within the scope of computer-readable media.

Referring to FIG. 4A, light source unit 211 can be arranged to emit light waves that can be modulated to carry information that can subsequently be recovered by demodulating. In some aspects, light source unit 211 can be connected to or coupled with network node 110, and network node 110 can control the operation of light source unit 211 to produce the modulated light waves. Additionally or alternatively, light source unit 211 can be integrated within network node 110 or network node 110 can be integrated within light source unit 211. In some embodiments, light source unit 211 can contain a light driver (not shown) configured to provide a fixed continuous current. The light driver can be a continuous current driver or a constant voltage driver. By way of a non-limiting example, light source unit 211 can be a light emitting diode (LED), a continuous light source operable to be modulated by an aperture-like arrangement, such as a spinning slotted disk, or other light sources that are operable to be modulated as described herein. Light source unit 211 can be operable to produce light at a variety of wavelengths and/or at a variety of intensities or brightness levels. For example, light source unit 211 can be operable to produce light having a visible, an infrared, or an ultraviolet component, or any combination of visible, infrared, and ultraviolet components.

Network node 110 can be operable to generate a random number using a random number generator 207 associated with network node 110. In some embodiments, network node 110 generates a random number each time a power-on event occurs (i.e., network node 110 is powered-up). For example, when network node 110 is powered-up and determined to be in an un-commissioned state, random number generator 207 of network node 110 can generate a random number. The number of bits generated by random number generator 207 can be any number of bits deemed to be adequate for network security. In some embodiments, the random number can be generated using a hardware random number generator 207 generated by a random physical process, such as, for example, thermal noise, radioactive decay, quantum tunneling, etc.

Modulation unit 209 of network node 110 can generate a modulation signal that includes the random number (encryption key), and modulate a light carrier wave using the modulation signal to generate a modulated light carrier wave. The modulated carrier wave can be transmitted using light source unit 211 to network control unit 130 via image capture device 120. In some embodiments, the signal or information modulated onto the light carrier wave can have a predetermined period and network node 110 can direct light source unit 211 to repeat the pattern at a predetermined repeating interval or cycles. Image capture device 120 or camera subsystem 317 can be arranged to receive the modulated light produced by light source unit 211 directly (line-of-sight) or reflected off a reflective surface. Image capture device 120 can be a mobile wireless communication device or a mobile device that can comprise various computing devices such as a laptop or other portable computer, a smart phone, a personal digital assistant (PDA), and the like.

Figure 4B:
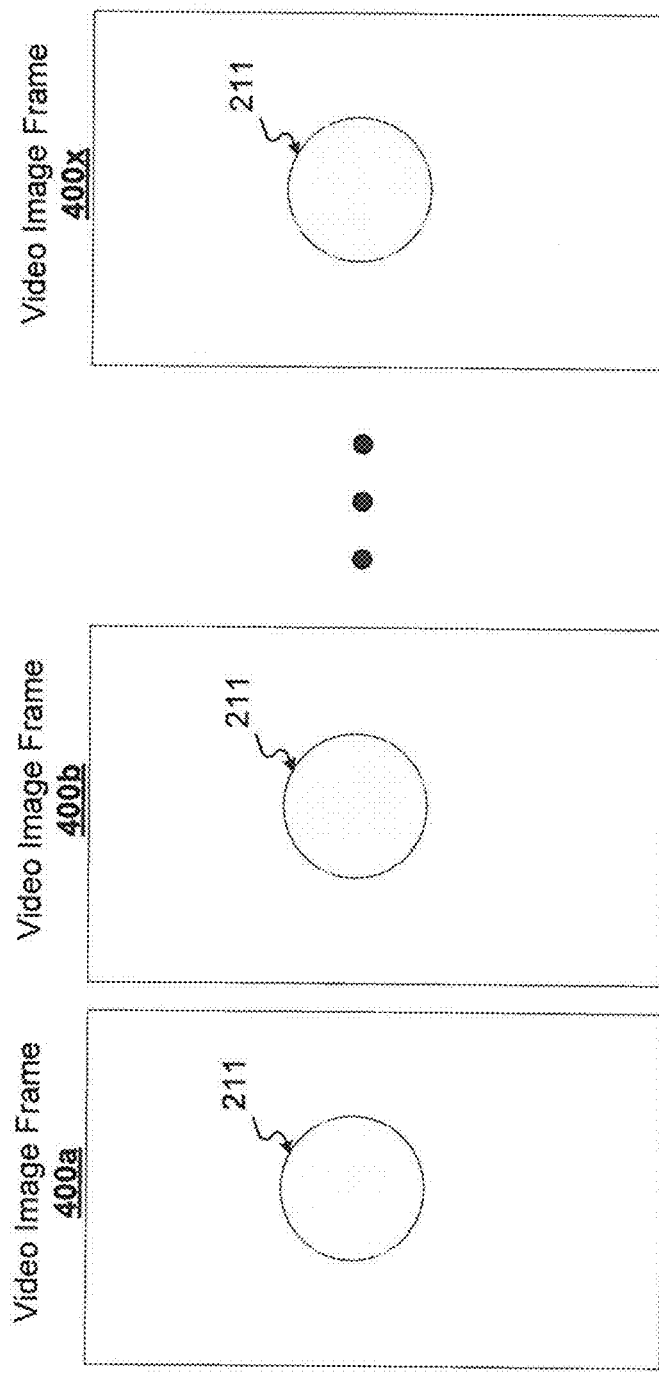
FIG. 4B is a diagram illustrating example image frames containing images corresponding to a modulated carrier wave detected by an image capture device in accordance with aspects of the disclosure.

Referring to FIG. 4B, in an example video mode embodiment, camera subsystem 317 can be incorporated into image capture device 120 and can be operable to capture images of the modulated light signal in a series of video image frames, such as video image frame 400a, video image frame 400b, up to a desired number of video image frame 400x. Image processing software can use the captured images to locate light source unit 211 within each of video image frame 400a, video image frame 400b, and so forth to video image frame 400x, sample the image data within each of video image frame 400a, video image frame 400b, and so forth to video image frame 400x, compare pixel values associated with light source unit 211 between the two or more video frames, and demodulate the light signal using the comparison data. The image processing software maybe operable to sample the pixel data according to any image sampling technique. In certain aspects, the modulation rate and the video frame rate may be synchronized such that minimum sampling requirements are met. In other aspects, when the modulation rate and video frame rate are not automatically synchronized, the video frame rate may be set such that it is at least twice the modulation symbol rate.

Referring again to FIG. 4A, in some streak mode embodiments, network node 110 can be connected to or coupled with an actuator (not shown) which can be operable to impart a periodic motion to light source unit 211 in such a way that light source unit 211 can be moved along a path while emitting light. In this example, light source unit 211 can be in motion, and image capture device 120 can be stationary. Camera subsystem 317 can be incorporated into image capture device 120 and can be operable to capture, within a single frame, the entirety of the modulated data by means of spatial displacement of the light within the image due to relative motion between the camera subsystem 317 and the light source unit 211. The image can be captured by camera subsystem 317 while the field of view of camera subsystem 317 is moving relative to light source unit 211. The camera subsystem 317 can be moved in such a way that the field of view of camera subsystem 317 is swept past the light source unit 211. Likewise, the light source unit 211 can be moved in such a way that the light emitted by the light source unit 211 is swept past the camera subsystem 317 or image capture device 120. Light source unit 211 can be modulated in a continuously repeating cycle to provide the signal encoded or modulated with the data to be transmitted. Because of the motion of camera subsystem 317, the resulting image can contain a streak, such as the streaks shown in FIGS. 7 and 8 and discussed below, that is spatially modulated according to the signal encoded with the data. These streaks can be identified within the image and decoded by image processing software in camera subsystem 317 or image capture device 120 to recover the data encoded or modulated within the signal.

The motion imparted to camera subsystem 317 or image capture device 120 can be such that the streak can have little, if any, overlap. For example, one type of motion that can be imparted to camera subsystem 317 or image capture device 120 can include a rotation that produces a circular or a spiral streak that can form a long, non-overlapping path. Another type of motion can be a back-and-forth-type oscillation that can be achieved by twisting the camera subsystem 317 or image capture device 120 around a center of motion, which can result in the streak being folded back on itself. An accelerometer and/or gyroscope unit 313 in camera subsystem 317 or image capture device 120 can be used to cause the camera subsystem 317 to capture images only during that portion of the oscillation that produces an image having little, if any, overlap regions. The accelerometer and/or gyroscope unit 313 can be operable to determine or extract information representing angular velocity and the accelerometer can be operable to determine or extract information representing linear or angular acceleration of the camera subsystem 317 or image capture device 120 relative to an inertial frame of reference. A linear velocity relative to a particular set of starting conditions can be derived from the angular velocity, linear acceleration, and/or angular acceleration. For example, if a starting condition is a state of rest relative to the light source unit 211, and assuming that the light source unit 211 stays at rest in that frame of reference, then the linear velocity relative to the light source unit 211 can be derived. For example, velocity and/or acceleration data can be used to determine at which point camera subsystem 317 or image capture device 120 has begun to repeat the back-and-forth motion or determine a path, along which the field of view of camera subsystem 317 or image capture device 120 was moving. For example, the point or region at which the camera subsystem 317, image capture device 120, or light source unit 211 change direction at the extremes of an oscillating motion can lead to the light or signal being captured as an image having an overlap region. This overlap region can render the portion of the image difficult to decode or demodulate since different portions of the signal can be captured at the same region of the image. Therefore, the accelerometer and/or gyroscope unit 313 can be used in conjunction with an application operating on the image capture device 120 to instruct the camera subsystem 317 not to capture images during these extreme motion positions where overlap can occur.

Image capture device 120 can be operable to confirm through a user feedback mechanism, such as a visual, audible, and/or tactile indication that an image was captured. In some aspects, additional feedback can be provided to the user to help the user learn optimal or near-optimal rate and amplitude of the oscillations, where optimal or near-optimal refers to a rate and amplitude of oscillation that captures little, if any, overlap of the streak.

The information or data provided to the light source units 211 can be arranged to be modulated or encoded in one or more data symbols, such that the boundaries of the individual symbols modulated or encoded in the overall data packet can be determined. A symbol is the minimal unit of signaling. The act of sending a signal entails selecting one symbol from an alphabet of two or more symbols and transmitting the selected symbol, where 'transmitting" means setting the state of the channel to a representation of that symbol. In the case of an alphabet consisting of only two symbols, a symbol represents one bit of information. With an alphabet of four symbols, each symbol represents two bits (i.e., a one-out-of-four choice). This requires the communications channel support four distinct states, for example, four distinguishable amplitude levels.

For example, recovery of the data or symbol positions can be achieved using a line code. In particular, a line code with a relatively high clock content can be used since there can be a large variation in the rate of motion of the camera subsystem 317 during an exposure. For example, a line code with high clock content, such as, Manchester encoding can be used. In this example encoding scheme, at least one transition is used for every symbol, regardless of the data pattern, at a cost of devoting half of the channel capacity to clock information. "Non-Return-to-Zero" encoding, by contrast, has no imbedded clock information, so a long run of a single symbol has no transitions in the line state. This makes efficient use of the channel for data, but in a classical communications channel this can be difficult to properly decode because of drift between the transmitter clock and the receiver clock. Run-length-limited codes are an intermediate form that guarantees at least one transition every N symbol times. In the context of this disclosure, low clock content causes difficulty because of the non-constant rate of relative motion between the network node 110 (or light source unit 211) and the field of view of camera subsystem 317. This is analogous to clock drift with a normal channel. In some aspects, data from the accelerometer and/or gyroscope unit 313 can be used since the higher-order derivatives of the motion tend to be well-behaved and can allow for a velocity prediction algorithm to reduce the clock content requirement. In some aspects, the direction of motion can be inferred from the accelerometer data. In some aspects, a fixed preamble that is unambiguous with the symbol coding can be used to mark the packet boundaries. The preamble can also serve to indicate the direction of motion.

The amount of data that can be communicated can be dependent on a number of factors including, for example, the number and arrangement of the light source units 211 and the operation of the camera subsystem 317. A portion of the data communicated may be consumed by the encoding overhead necessary to allow correct identification of symbol and frame boundaries and another portion can be given to error correction coding.

In implementations where video is captured, various forms of modulation, encoding, and framing can be applicable to the optical channel just as they are to a radio-frequency channel. In particular, the modulation can range from simple on-off keying to M-ary or analog amplitude modulation. Subcarriers could be employed, broadening the range to include angle modulation of the subcarrier, but subcarrier modulation seems an unlikely candidate because the frame rate on the camera subsystem severely limits the modulation rate. As it is desirable work with a variety of cameras, the minimal common frame rate must be assumed. In implementations where a subcarrier is used, modulation unit 209 can be operable to modulate the subcarrier, which subsequently modulates the amplitude of the light using any modulation technique, including, by way of non-limiting example, phase-key shifting (PSK) in which a finite number of phases are used, frequency-shift keying (FSK) in which a finite number of frequencies are used, amplitude shift-shift keying (ASK) in which a finite number of amplitudes are used, and quadrature amplitude keying (QAM) in which a finite number of at least two phases, and at least two amplitudes are used. Thus, as a non-limiting example, the modulation and data encoding can use an On-Off Keying (OOK) protocol, which can include turning the light source unit 211 "on" to represent a 1 and "off" to represent a 0. In some aspects, when light source unit 211 is operable to emit light at multiple brightness levels, an Amplitude Shift Keying ("ASK") protocol can be used and can allow higher data rates in which the signal is transmitted by allowing each spatial location to represent more than one bit. In still other aspects, the wavelength at which light source unit 211 emits light can be modulated. In this example, the modulation can be detected as differential changes in the amplitude of two or more color channels. And, in some aspects, other modulation techniques or protocols can be used including pulse width modulation and pulse position modulation. The addition of a subcarrier can be used to improve rejection of interference; however, a dedicated photodetector would likely be needed because the frame rate of a video camera is quite low compared to the desired subcarrier frequency.

Figure 5A:
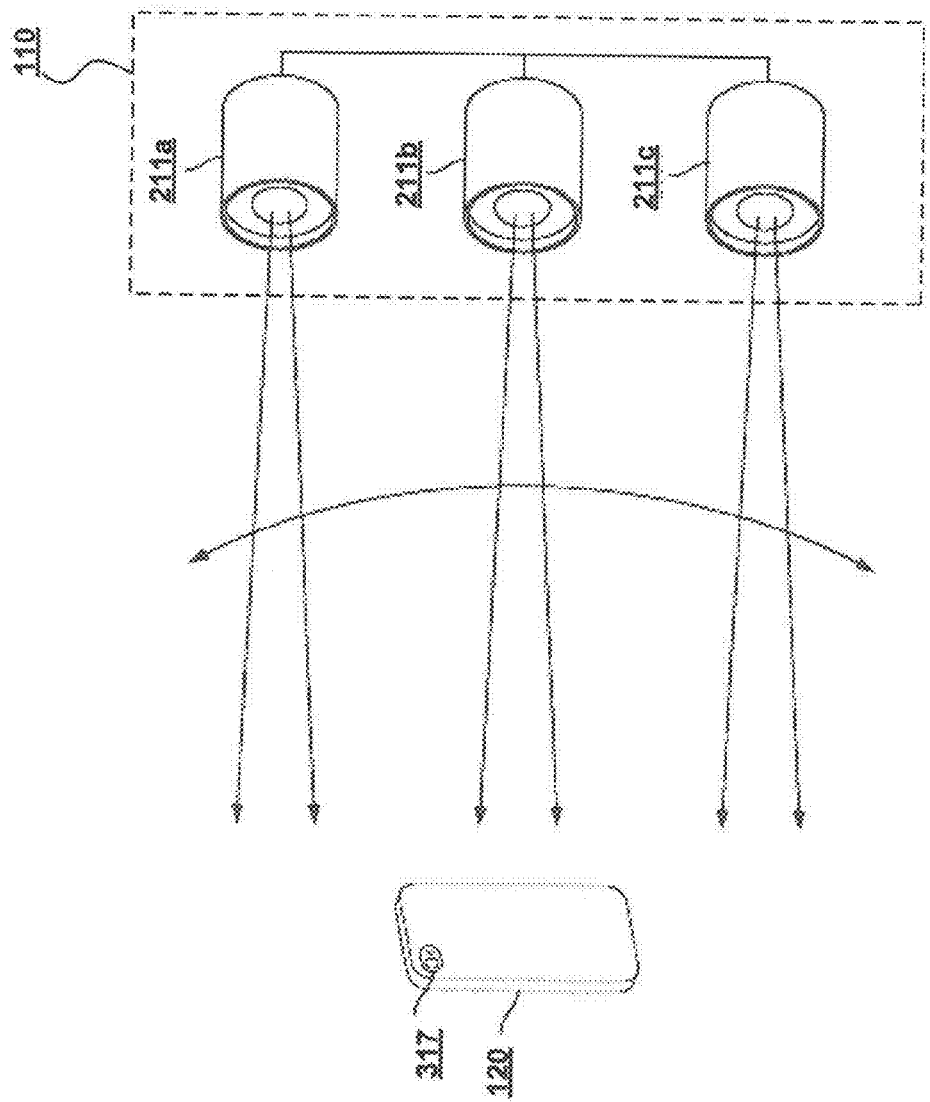
FIG. 5A is a diagram illustrating an example network node arranged to transmit a modulated signal having a light transmitting unit with more than one light transmitter operable to produce a modulated carrier wave that can be detected by an image capture device in accordance with aspects of the present disclosure.

FIG. 5A is an example block diagram, similar to FIG. 4A, illustrating a system arranged to transmit and receive a modulated signal in accordance with aspects of the present disclosure. It should be readily apparent to one of ordinary skill in the art that the system depicted in FIG. 5A represents a generalized schematic illustration and that other components/devices can be added, removed, or modified.

FIG. 5A shows a system with more than one light source unit 211 operable to produce a modulated light pattern that can be detected by a camera device. Although only three light source units 211 are shown in this example, any number of light source units 210 can be used, including, for example, two light source units 210 or four or more light source units 210. Moreover, the linear arrangement is just one example arrangement using multiple source units 210. Other suitable arrangements for source units 210 can also be used. For example, source units 210 can be arranged in a clustered formation. Network node 110 can be operable to control operation of each light source units 210a, 210b, and 210c. In the multiple light source unit 210 arrangement, each light source unit 210a, 210b, and 210c can be operable to transmit a part of the information or signal, which then can be captured as a separate streak by the camera subsystem 317 or image capture device 120. Additionally or alternatively, each light source unit 210a, 210b, and 210c can be operable to emit light in a visible, an infrared, an ultraviolet wavelength, or any combination of visible, infrared, and ultraviolet wavelengths and can be operable to be modulated or encoded using a modulation selected from the group consisting of a modulation in brightness, a modulation in intensity, a modulation in wavelength, a modulation in polarization, and combinations thereof. In some aspects, each light source unit 210a, 210b, and 210c can be arranged with its own individual driver (not shown) and actuator (not shown) that is operable to impart periodic motion to the respective light source units 211.

Figure 5B:
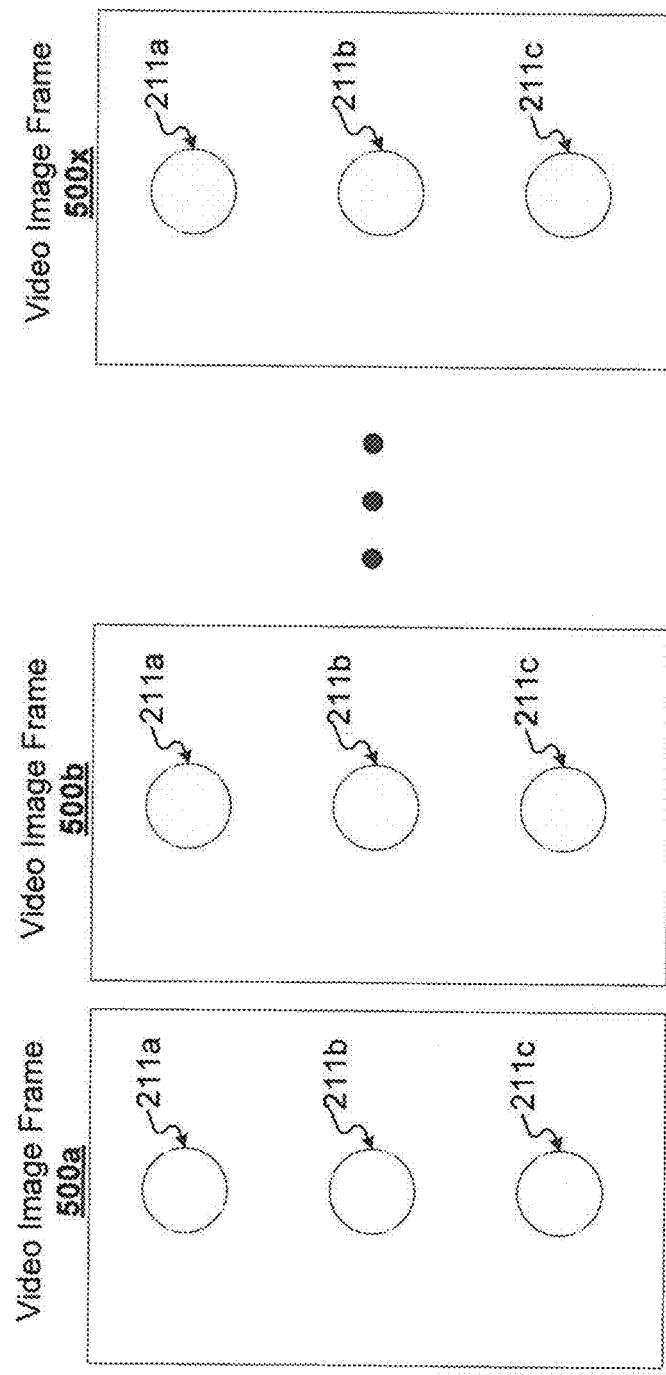
FIG. 5B is a diagram illustrating example image frames containing images corresponding to more than one modulated carrier wave detected by an image capture device in accordance with aspects of the disclosure.

Referring to FIG. 5B, in an example video mode embodiment having more than one light source unit 210, image capture device 120 can be operable to capture images of the modulated light signal in a series of video image frames, such as video image frame 500a, video image frame 500b, up to a desired number of video image frame 500x. Image processing software can use the captured images to locate light source units 211a, 211b, and 211c within each of video image frame 500a, video image frame 500b, and so forth to video image frame 500x. Where, as in FIG. 5B, there are multiple light source units 211, the individual light source units 211a, 211b, and 211c can appear in distinct regions or areas of the video image frames, and the image demodulating mechanism can distinguish the individual light source units 211a, 211b, and 211c from one another. Using these identified areas or regions as a reference, for example, the image processing software can sample the image data within each of video image frame 500a, video image frame 500b, and so forth to video image frame 500x, compare the sampled pixel values associated with light source units 211a, 211b, and 211c between the two or more video frames, and demodulate the light signal using the comparison data. As discussed in connection with FIG. 4A, the image processing software maybe operable to sample the pixel data according to any image sampling technique. In some implementations, the camera subsystem 317 or image capture device 120 can be operable to sense multiple uncommissioned nodes at the same time, and can be operable to concurrently receive, demodulate, and commission multiple nodes at once.

In the arrangement of FIGS. 4A and 5A, in an example streak mode, if a single camera frame is used to capture the light, then the image capture device 120 can be operated such that an exposure time of the camera subsystem 317 to capture the at least one image is greater than the at least one period of the modulated signal encoded in the light. However, if more than one camera frame is being used, then the an exposure time of one image can be less than the period of the modulated signal, so long as the aggregate non-overlapping exposure time of the multiple images is greater than the period.

In some aspects, the camera subsystem 317 or image capture device 120 can be operable to process different wavelengths through a color sensor. In this aspect, multiple co-located light source units 210 of different wavelength can allow higher data rates to be transmitted by processing each wavelength as an independent channel.

A linear array of light source units 210a, 210b, and 210c oriented perpendicularly to the expected mean trajectory of the field of view of camera subsystem 317 can also be used to increase the data rate. Depending on the field of view of the camera subsystem 317, two independent linear arrays of light source units 210 that are spatially separated and oriented along perpendicular axes can be employed such that, for any likely camera subsystem 317 trajectory, the individual elements of one array or the other are distinguishable in the image. Two perpendicular linear arrays, each emitting a different wavelength, could also be co-located without interference.

Figure 6:
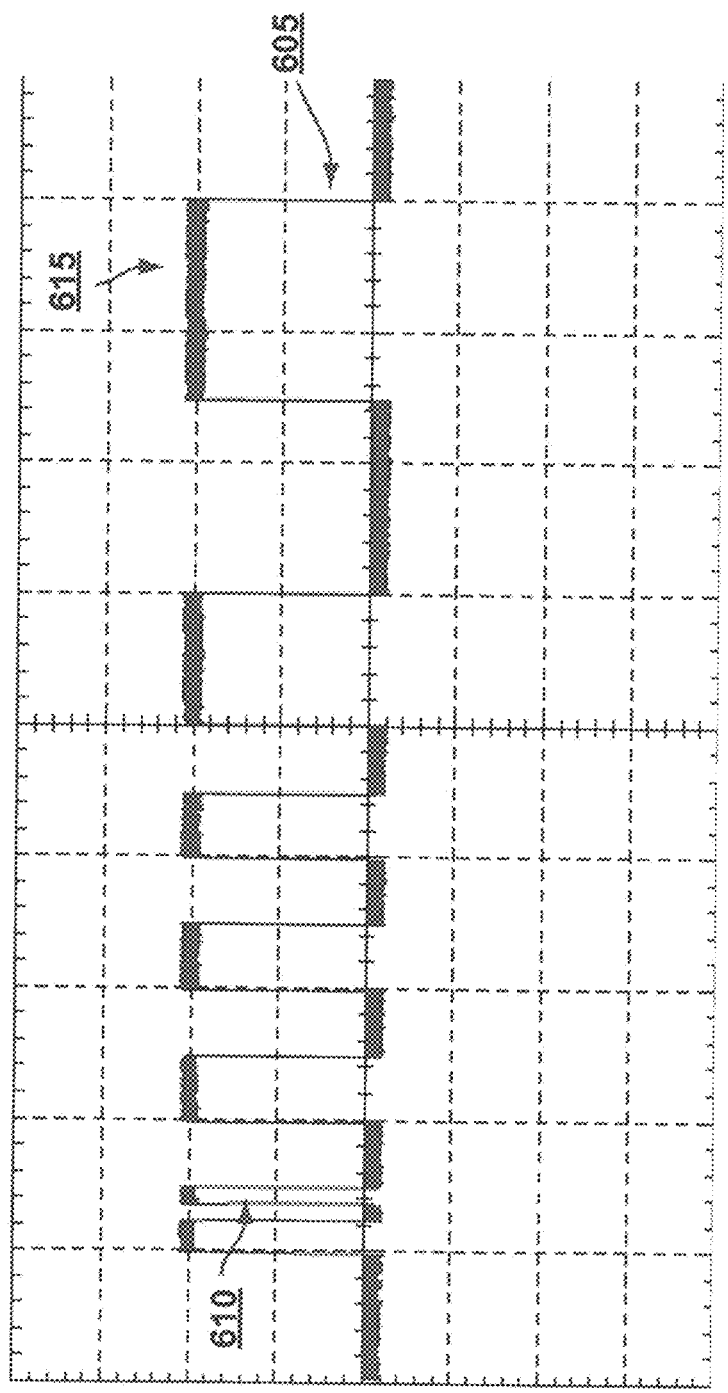
FIG. 6 is a diagram illustrating an example test waveform that can be transmitted from a network node to a light transmitting unit for transmission in accordance with aspects of the present disclosure.
Figure 7:
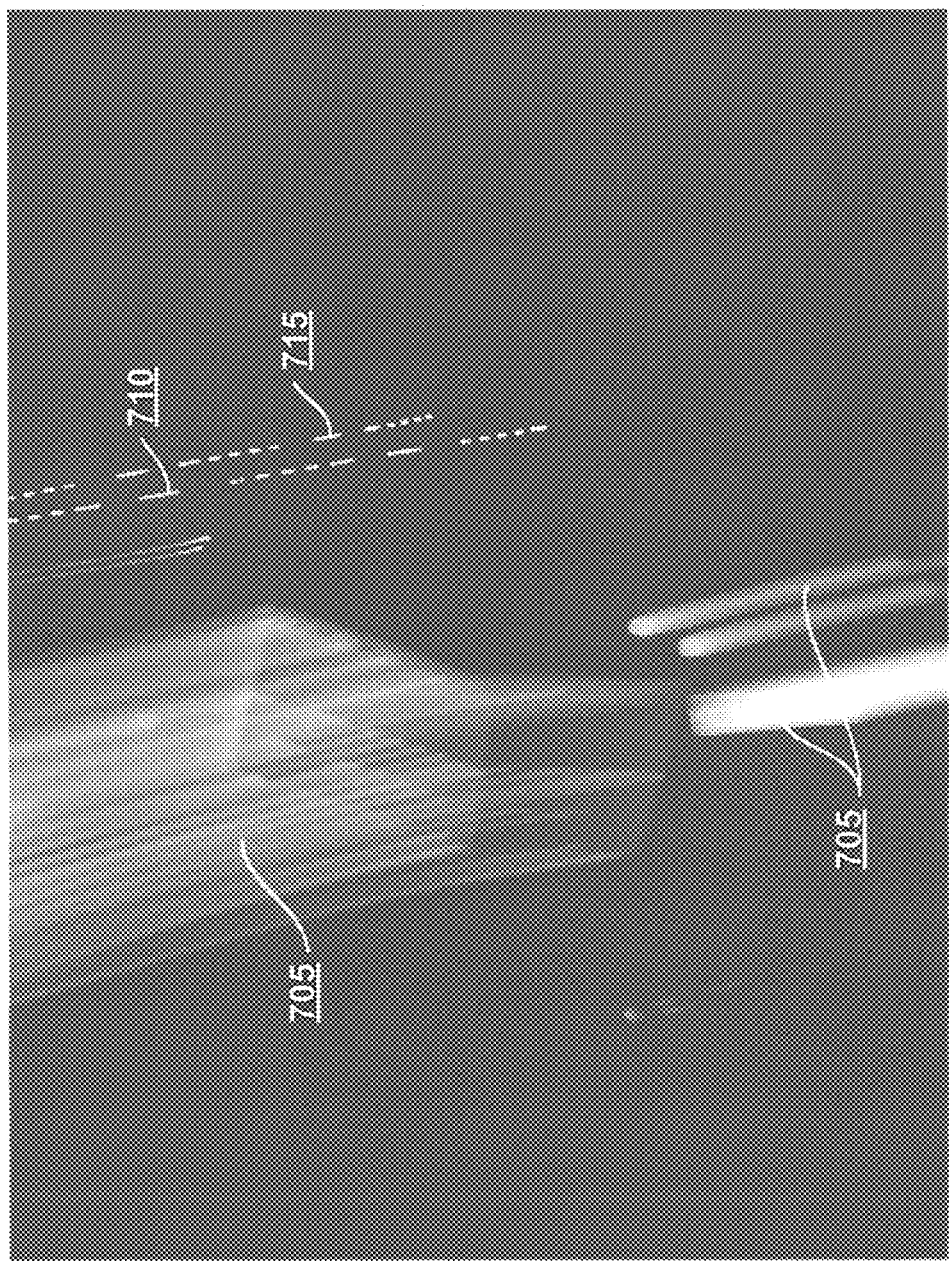
FIG. 7 is a diagram illustrating an example image captured by an image capture device in accordance with aspects of the present disclosure.
Figure 8:
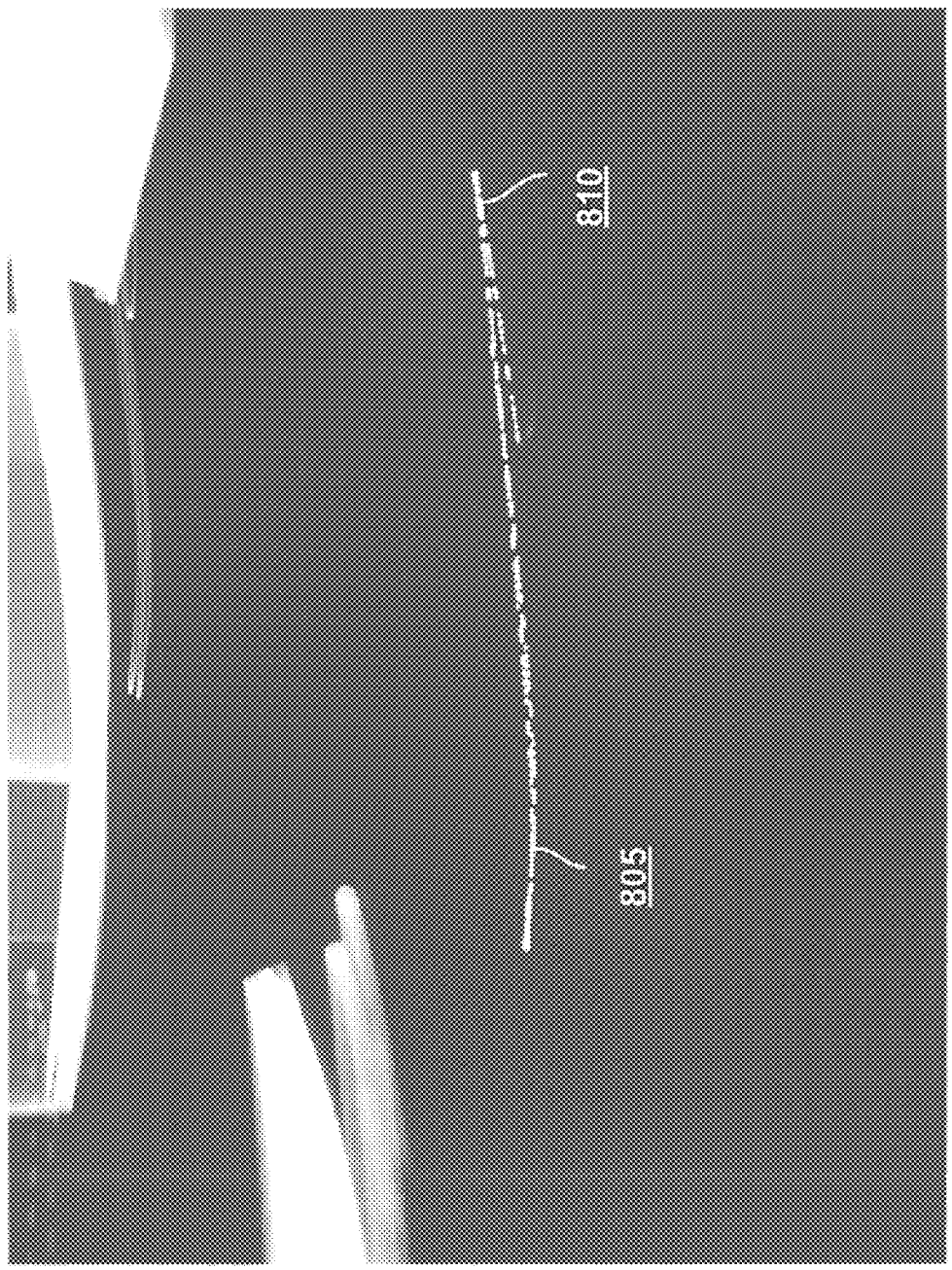
FIG. 8 is a diagram illustrating another example image captured by an image capture device in accordance with aspects of the present disclosure.

FIGS. 6, 7, and 8 are example diagrams corresponding to streak mode embodiments. FIG. 6 shows an example test waveform that can be transmitted from a modulation unit, such as modulation unit 209, of a network node, such as network node 110, to a light source unit, such as light source unit 210. Waveform 605 can include features ranging in duration from about 500 μs at 610 to as long as 3 milliseconds at 615. The upper limit of the feature size is limited by the ability of camera subsystem 317 or image capture device 317 to discern symbol boundaries, as discussed above regarding clock content.

FIG. 7 shows an example image captured by a camera, such as camera subsystem 317, of an image capture device, such as image capture device 120. The image illustrated in FIG. 7 includes background objects 705 which become blurred due to the motion of the camera subsystem and modulated signal 710 and 715. Light encoded with modulated signals 710 and 715 are captured as streaks while camera subsystem 317 is moving in different directions in a back-and-forth manner. The modulated signal or light can be imparted by light source unit 211 and controlled by a network node unit 110, as described in relation to FIGS. 4 and 5. Light source unit 211 can be operable to emit light in a visible, an infrared, an ultraviolet wavelength, or any combination of visible, infrared, and ultraviolet wavelengths and can be operable to be modulated or encoded using a modulation selected from the group consisting of a modulation in brightness, a modulation in intensity, a modulation in wavelength, a modulation in polarization, and combinations thereof.

In FIG. 7, the light source unit 211 can be controlled to impart a modulation pattern onto the signal 410 and 415, using a variety of modulation schemes, as discussed above. The simplest modulation scheme involves repeatedly turning the light source unit 211 on and off. This modulated pattern can be captured by camera subsystem 317 or image capture device 120 as a series of dots or dashes, representative of when light source unit 211 is turned on, interspersed with dark regions, representative of when light source unit 211 is turned off. The dots or dashes can represent a "1" and the dark region can represent a "0," using this simplistic example. The reverse encoding scheme can also be used, where the dots or dashes represent a "0" and the dark region represents a "1."

An application operating with camera subsystem 317 or on image capture device 120 can be operable to demodulate or decode the image captured by camera subsystem 317 using the encoding scheme, or its inverse decoding scheme, that was employed in the encoding process, using, for example demodulation unit 316. The application can be operable to determine which portions of the image contain the modulated or encoded information and to apply the appropriate decoding scheme to that portion of the image which was determined to contain the encoded information.

FIG. 8 shows another example image captured by a camera, such as camera subsystem 317, of an image capture device, such as image capture device 120. The modulated signal 805 as represented as the streak has an overlap region 810 that can result when camera subsystem 317 is moved in a back-and-forth manner. An accelerometer and/or gyroscope unit 313 of image capture device 120 can be used to control the exposure of camera subsystem 317 to prevent or reduce the amount of overlap in the modulated data captured by camera subsystem 317. The accelerometer and/or gyroscope unit 313 of image capture device 120 can be used to determine a point or region at which motion imparted to the camera subsystem 317 or image capture device 120 moves or folds back on it, which can be captured as an overlap region. The remaining portion of the captured signal or light that does not overlap can be analyzed to determine to information encoded or modulated onto the signal using, for example, an application operable on image capture device 120.

Figure 9:
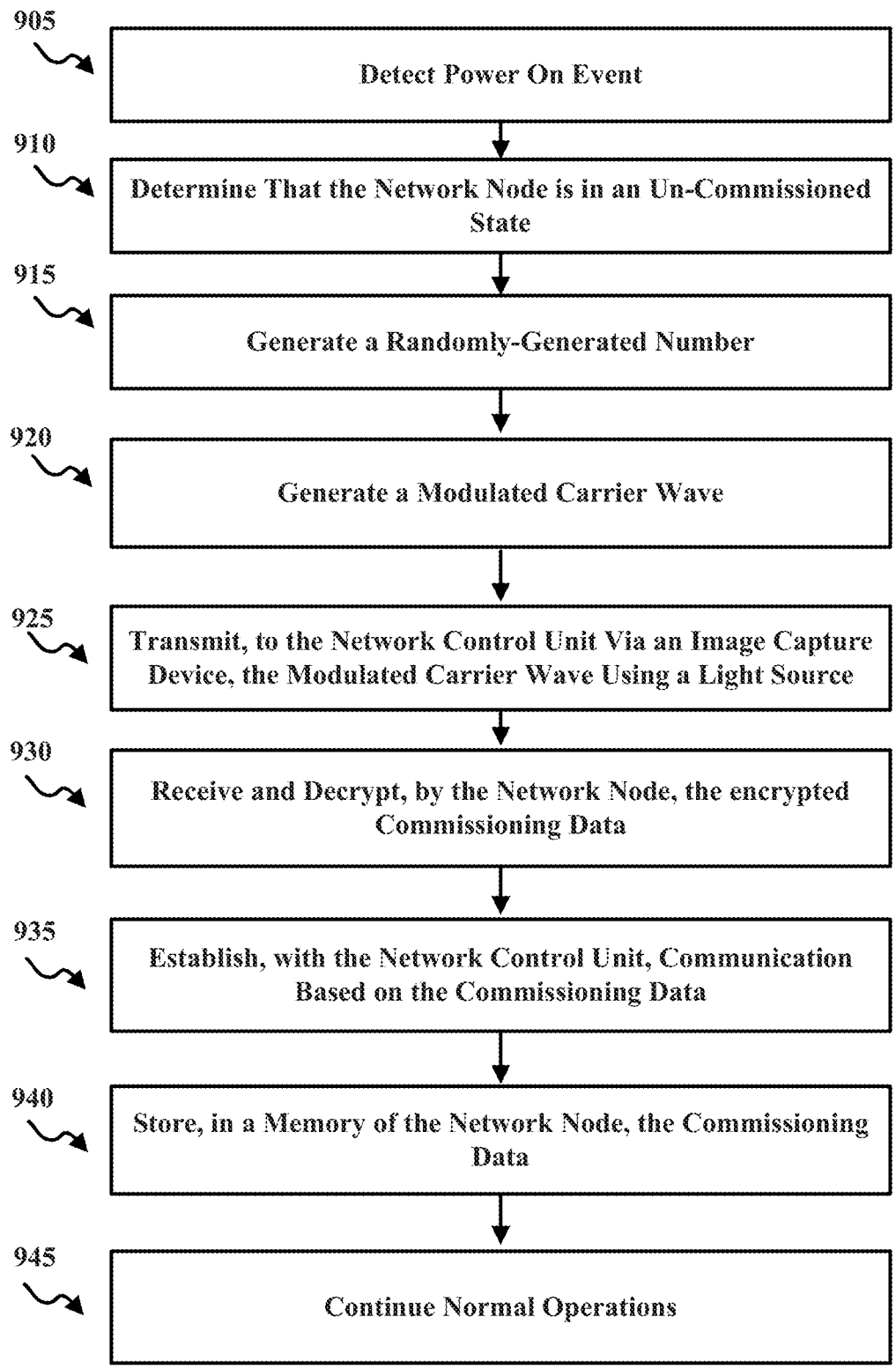
FIG. 9 is a flowchart illustrating commissioning of a network node using optical communications in accordance with aspects of the present disclosure.

FIG. 9 illustrates a flowchart for commissioning of a network node 110 with a network control unit 130 via an image capture device 120 using optical communications in accordance with aspects of the present disclosure. In FIG. 9, CPU 201 of network node 110 may detect that a power on event has occurred (905). CPU 201 may then determine whether network node 110 is in a non-commissioned state (910). In one embodiment, CPU 201 may determine that network node 110 is in a non-commissioned state by checking if commissioning data is stored in a memory, such as, for example, RAM 202, ROM 203, or storage 210 of network node 210. If CPU 201 determines that commissioning data is stored in a memory of network node 110, CPU 201 may determine that network node 110 is in a commissioned state (910, No), and CPU 210 will cause network node 110 to continue with normal operations (940).

When CPU 201 of network node 110 determines that commissioning data is not stored in a memory of network node 110, CPU 201 may determine that network node 110 is in a non-commissioned state (910, Yes). CPU 201 can then cause random number generator 207 of network node 110 to generate a random number (915) using, for example, one or more hardware and/or software processes, as disclosed above. An un-commissioned network node 110 can be configured to generate a new random number each time it is powered-on. Thus, if network node 110 is powered-off without having completed the commissioning process, network node 110 will not save the generated random number.

Modulation unit 209 of network node 110 can generate a modulated carrier wave signal by modulating a carrier wave emitted by light source with the generated random number (920). Light source unit 211 of network node 110 can transmit the modulated carrier wave to a network control unit 130 via an image capture device 120 (925). In some embodiments, network node 110 can modulate the carrier wave with the generated random number in a continuous cycle while waiting to receive a transmission from network control unit 130 of an initial commissioning message. The initial commissioning message is encrypted by network control unit 130 with the generated random number and can be received by network node 110 via a radio channel. Thus, for example, image capture device 120 may capture the light transmitted from light source unit 211 of network node 110 using either a video mode operation or a streak mode operation, and demodulate the captured light, using, for example, demodulation unit 316. Image capture device 120 can further transmit the demodulated data (e.g., the random number generated in 915) to network control unit 130. Network control unit 130 can identify a new or updated communication protocol and identify a new or updated encryption key, which network control unit 130 can transmit via a communication signal, such as, for example, a radio communication signal to network node 110 that is encrypted using the generated random number. In some embodiments, network control unit 130 can replace the randomly-generated number with a session key valid for the remainder of the commissioning process. In other embodiments, network control unit 130 can replace the randomly-generated number with a network key that is valid for general transactions via the network. Thus, network node 110 may never encrypt any communications with the randomly-generated number but may, instead, only use the randomly-generated number as a key when decrypting the first commissioning message.

Network node 110 can receive, from network control unit 130, and decrypt the encrypted commissioning data using the generated random number (930). The commissioning data may be an initial commissioning message and may be used to enable network node 110 to join a network controlled by network control unit 130. The commissioning data can include an updated network protocol and/or an updated encryption key. Network node 110 can establish communication with network control unit 130 (935). Establishing communication may include, in some aspects, transmitting a serial number or other unique identification from network node 110 to network controller 130 via the radio channel.

In some embodiments, network node 110 can establish communication with network control unit 130 via a radio channel using an encryption key specified by network control unit 130 in the initial commissioning message. Thus, a first communication from network node 110 can be optical communication transmitted and received via light source unit 211, and subsequent communications can be radio communication transmitted and received via antennas 205. Once the commissioning process is complete, network node 110 can store the commissioning data received from the network control unit in a memory such as, for example, RAM 202, ROM 203, or storage 210 of network node 210 (940), and continue with normal operations (945).

The present disclosure is not to be limited in terms of the particular embodiments described in this application, which are intended as illustrations of various aspects. Many modifications and variations can be made without departing from its spirit and scope, as will be apparent. Functionally equivalent methods and apparatuses within the scope of the disclosure, in addition to those enumerated herein, will be apparent from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood, all language such as "up to," "at least," "greater than," "less than," and the like include the number recited and refer to ranges which can be subsequently broken down into subranges as discussed above. Finally, as will be understood, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent. The various aspects and embodiments disclosed herein are for purposes of illustration and are not intended to be limiting, with the true scope and spirit being indicated by the following claims.

What is claimed is:

1. A computer-implemented method for commissioning of network node devices using optical communications in a wireless network associated with a network control unit, comprising:
    determining, by a network node device, that the network node device is not commissioned;
    providing, by the network node device, a random number to the network control unit, wherein providing the random number comprises:
        generating, by the network node device, the random number,
        generating a modulated light signal based on the random number, and
        transmitting, to a photodetector, the modulated light signal;
    receiving, from the network control unit, via a radio channel, an encrypted commissioning message, wherein the encrypted commissioning message is based on the random number provided by the network node device to the network control unit;
    decrypting, by the network node device, the encrypted commissioning message using the random number; and
    establishing, with the network control unit, communication based on data in the encrypted commissioning message.

2. The computer-implemented method of claim 1, further including:

storing, in a memory of the network node device, commissioning data.

3. The computer-implemented method of claim 1, wherein the determining that the network node device is not commissioned further includes:
determining, by the network node device, that commissioning data is not stored in a memory of the network node device.

4. The computer-implemented method of claim 1, wherein the receiving the encrypted commissioning message further includes:
receiving, from the network control unit, an indication of an updated communication protocol.

5. The computer-implemented method of claim 4, wherein the receiving the updated communication protocol further includes:
receiving, from the network control unit, an indication of an updated encryption key.

6. The computer-implemented method of claim 1, wherein the establishing the communication further includes:
establishing radio communication with the network control unit.

7. The computer-implemented method of claim 1, wherein the generating the random number further includes:
generating the random number using a random number generator associated with the network node device.

8. The computer-implemented method of claim 7, wherein the generating the random number further includes:
generating the random number using an entropy source.

9. The computer-implemented method of claim 8, wherein the entropy source comprises one or more of: thermal noise, quantum tunneling, a hardware-based entropy source, and a software-based entropy source.

10. The computer-implemented method of claim 1, wherein the random number is a session key.

11. A network node device that uses optical communications for commissioning into a wireless network having a network control unit, the network node device comprising:
at least one memory to store data and instructions;
at least one processor configured to access the at least one memory and execute instructions to determine that the network node device is not commissioned;
a random-number generator configured to generate a random number when the network node device is not commissioned;
a modulation unit configured to generate a modulation signal that includes the random number, and generate a modulated carrier wave by modulating a carrier wave with the modulation signal, wherein the modulated carrier wave is indicative of the random number;
a light transmitting unit configured to transmit, to the network control unit via an image capture device, the modulated carrier wave; and
a transceiver configured to receive commissioning data including network access information, and communicate with the network control unit based on the commissioning data, wherein the commissioning data is based on the random number indicated by the modulated carrier wave transmitted by the light transmitting unit to the network control unit.

12. The network node device of claim 11, wherein the at least one processor is further configured to:
store the commissioning data in the at least one memory.

13. The network node device of claim 11, wherein when the at least one processor is configured to determine that the network node device is not commissioned, the at least one processor is further configured to:
determine, upon power-up of the network node device, that the commissioning data is not stored in the memory of the network node device.

14. The network node device of claim 11, wherein when the transceiver is configured to receive the commissioning data, the transceiver is further configured to:
receive an indication of an updated communication protocol.

15. The network node device of claim 14, wherein when the transceiver is configured to receive the commissioning data, the transceiver is further configured to:
receive an indication of an updated encryption key.

16. The network node device of claim 11, wherein when the transceiver is configured to communicate with the network control unit, the transceiver is further configured to:
communicate with the network control unit using radio frequency communication.

17. The network node device of claim 11, wherein when the random-number generator is configured to generate the random number, the random-number generator is further configured to:
generate the random number using an entropy source.

18. The network node device of claim 17, wherein entropy source comprises one or more of: thermal noise, quantum tunneling, a hardware-based entropy source, and a software-based entropy source.

19. The network node device of claim 11, wherein the random number is a session key.

* * * * *